(12) United States Patent
Schlack

(10) Patent No.: US 9,143,813 B2
(45) Date of Patent: Sep. 22, 2015

(54) MULTI-VIDEO-SERVICE BANDWIDTH ALLOCATION

(75) Inventor: John Schlack, Quakertown, PA (US)

(73) Assignee: BEAUMARIS NETWORKS INC., Boxborough, MA (US)

( * ) Notice: Subject to any disclaimer, the term of this patent is extended or adjusted under 35 U.S.C. 154(b) by 485 days.

(21) Appl. No.: 13/024,849

(22) Filed: Feb. 10, 2011

(65) Prior Publication Data

US 2011/0197239 A1  Aug. 11, 2011

Related U.S. Application Data

(60) Provisional application No. 61/303,362, filed on Feb. 11, 2010.

(51) Int. Cl.
| | |
|---|---|
| *H04N 21/2385* | (2011.01) |
| *H04L 12/24* | (2006.01) |
| *H04L 12/911* | (2013.01) |
| *H04N 21/61* | (2011.01) |
| *H04N 21/6408* | (2011.01) |
| *H04N 21/24* | (2011.01) |
| *H04N 21/239* | (2011.01) |
| *H04N 21/472* | (2011.01) |

(52) U.S. Cl.
CPC ........ *H04N 21/2385* (2013.01); *H04L 41/0896* (2013.01); *H04L 47/72* (2013.01); *H04N 21/2393* (2013.01); *H04N 21/2402* (2013.01); *H04N 21/47202* (2013.01); *H04N 21/6118* (2013.01); *H04N 21/6408* (2013.01)

(58) Field of Classification Search
USPC ..................................................... 725/95, 96
See application file for complete search history.

(56) References Cited

U.S. PATENT DOCUMENTS

| | | | |
|---|---|---|---|
| 2004/0125779 | A1 | 7/2004 | Kelton et al. |
| 2005/0289618 | A1* | 12/2005 | Hardin ............................ 725/95 |
| 2008/0112312 | A1 | 5/2008 | Hermsmeyer et al. |
| 2008/0307453 | A1 | 12/2008 | Haberman |

(Continued)

FOREIGN PATENT DOCUMENTS

WO     WO2011/100459     8/2011

OTHER PUBLICATIONS

International Search Report mailed May 20, 2011 in corresponding International Application No. PCT/US2011/24386.

(Continued)

*Primary Examiner* — Jun Fei Zhong
(74) *Attorney, Agent, or Firm* — Patent Capital Group

(57) ABSTRACT

A channel allocation mechanism for manages bandwidth using a channel profile to assure an available channel for supporting the highest expected bandwidth request by leaving a contiguous segment available to support such requests. Configurations discussed further below define a profile for expected media types, and associate each channel with a profile designating the media types assignable on that channel. Each media type includes a service and a bitrate, thus different formats of the same service (such as SD and HD) are distinguished. Each profile specifies a media type, and each channel is associated with one or more profiles. Further, a mapping of channels to associated profiles includes a reserve designation, indicating that other (unreserved) be fully assigned before assigning the reserved channels. The reserved channels provide a contiguous block of bandwidth, so that large bandwidth requests do not encounter assignment failure from a plurality of sparsely allocated channels.

20 Claims, 9 Drawing Sheets

(56) References Cited

U.S. PATENT DOCUMENTS

2009/0025027 A1\* 1/2009 Craner ............................ 725/32
2009/0222405 A1 9/2009 Cara et al.
2011/0072475 A1\* 3/2011 McKiel, Jr. ................... 725/100

OTHER PUBLICATIONS

PCT Aug. 14, 2012 International Preliminary Report on Patentability and Written Opinion of the International Searching Authority from International Application No. PCT/US2011/24386.

PRC Oct. 10, 2014 SIPO 1st Office Action from Chinese Application Serial No. 20118009243.6.
EPO Sep. 2, 2014 Extended Search Report and Written Opinion from European Application No. 11742810.2.
Gong, Jiong et al., "VoD QAM Resource Allocation Algorithms," Networking Technologies, Services and Protocols; Performance of Computer and Communication Networks; Mobile and Wireless Communications System Lecture Notes in Computer Science, LNCS, Springer, Berling, DE, XP019030834; 13 pages, 2006.
PRC 2015-6-4 SIPO 2nd Office Action from Chinese Application Serial No. 20118009243.6.

\* cited by examiner

Fig. 7

| QAM Name | TSID | Frequency | Profile Name | Reserved |
|---|---|---|---|---|
| QAM1.200 | 200 | 617 MHz | VOD_3D | N |
| QAM1.201 | 201 | 623 MHz | VOD_3D, VOD | Y |
| QAM1.202 | 202 | 629 MHz | VOD_3D, VOD | N |
| QAM1.203 | 203 | 635 MHz | VOD_3D, VOD | N |
| QAM1.204 | 204 | 641 MHz | VOD_3D, VOD | N |
| QAM1.205 | 205 | 647 MHz | VOD_3D, VOD, SDV | N |
| QAM1.206 | 206 | 653 MHz | VOD_3D, VOD, SDV | N |
| QAM1.207 | 207 | 659 MHz | SDV | N |
| QAM1.208 | 208 | 665 MHz | SDV | N |

Fig. 8

| QAM Count | Profile Name | Reserved Count |
|---|---|---|
| 1 | VOD_3D | 0 |
| 4 | VOD_3D, VOD | 1 |
| 2 | VOD_3D, VOD, SDV | 0 |
| 2 | SDV | 0 |

MULTI-VIDEO-SERVICE BANDWIDTH ALLOCATION

RELATED APPLICATIONS

This application claims priority to and the benefit under 35 U.S.C. §119(e) of U.S. Provisional Patent Application No. 61/303,362, filed Feb. 11, 2010, entitled "MULTI-SERVICE BANDWIDTH ALLOCATION FOR 3D AND HD CONTENT," the contents of which is hereby incorporated by reference in their entirety.

BACKGROUND

Traditional cable TV systems were little more than a wired medium for transport of the radio-frequency (RF) signal formerly carried over the air. Coaxial (coax) cables carried a set of all available broadcast channels to each TV (subscriber). A settop box in such a system simply provided an alternate tuner for receiving the additional channels available via the coax. Each settop box received the same array of channels via the analog signal carried on the coax.

In such legacy systems, selective services (i.e. "movie" channels such as HBO®) employed physical filters, usually on the cable drop to individual houses, to provide these premium services. With the advent of digital transport mediums, the same coax also carries digital signals. Modern settop boxes evolved to individually addressable network devices, so premium channels became switchable from a central office or headend. Selective viewing evolved to provide a greater granularity of control to individual settop boxes, allowing for video-on-demand (VOD) and switched digital video (SDV), thus enabling individual subscribers invoke programming selectively directed to their settop box. Such a greater granularity of control, as well as improvements in the viewable picture quality provided by Hi-Def (HD) formats, imposed a demand for greater bandwidth on the transport network. While advances in the physical transport network, such as fiber optic and higher frequency ranges, facilitated transport of this greater bandwidth, continuing advances in transport formats and user control place an additional burden on service providers to prudently and efficiently manage available bandwidth to effectively provide video services to a multitude of users.

A video service delivery environment provides video services, such as switched digital video (SDV) and video on demand (VOD) and continue to proliferate as the network infrastructure continues to evolve to support the bandwidth demands of applications providing selective services. Such a network infrastructure includes headends for providing video services, service nodes for executing applications for delivering the video services, and set-top boxes or other user device for rendering the service to users. The network arranges the set-top boxes into service groups, which are collections of set-top boxes served by a common set of connections emanating from the head end and terminating at the service groups. Typically, each of the set-top boxes is disposed in geographic proximity to others in the group, and the connections defined by physical sets of lines that branch out to the various service groups. While generally available programming (i.e. basic cable) is typically available to all set top boxes, in a so-called "broadcast" transmission, other services such as video-on-demand are sent to individual set-top boxes on "narrowcast" channels.

SUMMARY

A video services environment includes a network connecting the set-top boxes or other customer premises equipment (CPE) to a headend and service node for providing subscriber requested services such as SDV and VOD. Each service group is allocated a predetermined number of fixed bandwidth channels for satisfying the narrowcast demand (i.e. VOD) in the service group. In an example configuration, the channels are modulated using Quadrature Amplitude Modulation 256 (QAM 256) for carrying 38.8 Mbps, commonly called QAM channels or simply QAMs. Since each service group has a predetermined number of channels to share between all settop boxes, the video services environment manages the bandwidth collectively available to the service group to service all the subscriber requests for video services from the settop boxes in the group.

In a video service environment, such as that providing cable TV, users receive video services from a services provider, typically through a settop box. Modern settop boxes provide substantial user interface and service selection capabilities, in contrast to older conventional boxes that were little more than remote tuners. The settop boxes receive services on channels, or QAMs, which are shared by a set of settop boxes collectively designated as a service group. In contrast to broadcast services, which are received by all settop boxes in the group (typically a standard channel lineup), other services such as video on demand (VOD) and switched digital video (SDV) are allocated on a demand basis to the channels, collectively referred to as narrowcast services. Each service requires a particular portion of bandwidth, and the service provider satisfies requests for narrowcast services across a set of channels allocated to a service group. Each service group has a predetermined number of channels, typically 4, 6 or 8, which is shared by all users for narrowcast services.

In the video services environment, a video delivery server or headend receives subscriber requests and assigns the requests to channels based on a bitrate required to service the request. Each channel has a bandwidth for allocation to the request, and available bandwidth is thus decremented by the bitrate of the request for each assignment. A group of subscribers, denoted by a service group of settop boxes serving the subscribers, has an allocation of channels for servicing the subscriber requests by assigning the requests to one of the channels. A service profile categorizes the service type, the bitrate of the subscriber requests, and available channels associated with a profile denoting the subscriber requests that the channel may be assigned to service. In contrast to conventional approaches, which assign requests to channels based merely on a current channel load (typically the channel with the most bandwidth available), the service profile association ensures that requests corresponding to a particular service type or high bandwidth format, such as 3 dimensional (3D) video, do not preclude other subscriber requests by locking out or leaving unassignable bandwidth "gaps" in a single channel.

Configurations here are based, in part, on the observation that advances in video technology (i.e. 3D TV) has prompted additional, bandwidth hungry video formats to support the demand for available formats, particularly for HD and 3D formats. While standard definition (SD) formats consume only 3.75 Mbps of bandwidth, HD requires around 15 Mbps and 3D transmissions consume 38.4 Mbps, nearly an entire transport channel of 38.8 Mbps. Conventional approaches to bandwidth management for video service delivery do not distinguish between different bitrates of requested media, nor of the requested service to which they correspond. Emerging technology, such as 3D video, consumes 38.4 Mbps, effectively occupying an entire QAM 256 channel. Further, a contiguous bandwidth range in a channel is employed, thus the 38.4 Mbps range cannot be aggregated from available blocks across multiple channels.

Unfortunately, conventional arrangements suffer from the shortcoming that the media type of a request is not considered in bandwidth allocation. Bandwidth is merely metered out based on the bitrate of a request. Thus, conventional approaches do not earmark or denote a contiguous block of bandwidth to accommodate large bitrate requests, such as HD and 3D video, nor do such approaches recognized the service type of the requests to prevent a particular service from disproportionately consuming bandwidth and blocking users of other services. Evolving service formats, such as 3D video, continue to tax the current network infrastructure and require prudent management of available bandwidth.

Configurations herein substantially overcome the above-described shortcomings by providing a channel allocation mechanism for managing bandwidth to consistently assure an available channel to support the highest expected bandwidth request by leaving a contiguous segment available to support such requests. Configurations discussed further below define a profile for expected media types, and associate each channel with a profile designating the media types assignable on that channel. Each media type includes a service and a bitrate, thus different formats of the same service (such as SD and HD) are distinguished. Each profile specifies a media type, and each channel is associated with one or more profiles. Further, a mapping of channels to associated profiles includes a reserve designation, indicating that other (unreserved) channels are to be fully assigned before assigning the reserved channels. The reserved channels thus provide a contiguous block of bandwidth, such as for a 3D request, so that large bandwidth requests do not encounter assignment failure from a plurality of sparsely allocated channels.

Alternate configurations of the invention include a multi-programming or multiprocessing computerized device such as a workstation, handheld or laptop computer or dedicated computing device or the like configured with software and/or circuitry (e.g., a processor as summarized above) to process any or all of the method operations disclosed herein as embodiments of the invention. Still other embodiments of the invention include software programs such as a Java Virtual Machine and/or an operating system that can operate alone or in conjunction with each other with a multiprocessing computerized device to perform the method embodiment steps and operations summarized above and disclosed in detail below. One such embodiment comprises a computer program product that has a computer-readable storage medium including computer program logic encoded thereon that, when performed in a multiprocessing computerized device having a coupling of a memory and a processor, programs the processor to perform the operations disclosed herein as embodiments of the invention to carry out data access requests. Such arrangements of the invention are typically provided as software, code and/or other data (e.g., data structures) arranged or encoded on a computer readable medium such as an optical medium (e.g., CD-ROM), floppy or hard disk or other medium such as firmware or microcode in one or more ROM, RAM or PROM chips, field programmable gate arrays (FPGAs) or as an Application Specific Integrated Circuit (ASIC). The software or firmware or other such configurations can be installed onto the computerized device (e.g., during operating system execution or during environment installation) to cause the computerized device to perform the techniques explained herein as embodiments of the invention.

BRIEF DESCRIPTION OF THE DRAWINGS

The foregoing and other objects, features and advantages of the invention will be apparent from the following description of particular embodiments of the invention, as illustrated in the accompanying drawings in which like reference characters refer to the same parts throughout the different views. The drawings are not necessarily to scale, emphasis instead being placed upon illustrating the principles of the invention.

FIG. 7 shows mapping of service profiles of FIG. 6 to channels;

FIG. 8 shows templates for mapping service profiles to channels; and

DETAILED DESCRIPTION

Examples below depict allocation of channels for video services in a video services environment. Other environments may be envisioned, as well as additional services beyond the example VOD, SDV and 3D services depicted. The examples shown depict channel allocation for optimizing service delivery to users by satisfying the greatest number and/or most lucrative requests for services.

The video delivery server allocates channels to provide services to subscriber requests. A subscriber request, such as a VOD or SDV request, has a bandwidth requirement for satisfying the request. Further, each service may have multiple media types for delivery, such as standard definition (SD) or high definition (HD), for example. Thus, each subscriber request corresponds to a media type based on the service and bitrate of the subscriber request. The required bandwidth is determined by the bitrate of the media type requested. For example, a VOD request may be for a high definition (HD) selection and require 15 Mbps, or may be a standard definition (SD) request expecting only 3.75 Mbps.

In configurations disclosed herein, a video delivery server employs a service network for providing video services responsive to subscriber requests by allocating bandwidth to channels to service the request. Each subscriber request emanates from a settop box operable by the subscriber, and typically includes a graphical user interface (GUI) for identifying available services and generating the subscriber request. The service network interconnecting the server and the settop boxes transports the request upstream to the server, where the server determines channel availability and assignment of the request to a channel. Each of the channels represents a particular bandwidth range modulated according to an encoding scheme or protocol adapted to transport the requested media. In the example arrangement, each channel employs Quadrature Amplitude Modulation 256, or QAM 256, which provides a bandwidth of 38.8 Mbps in the 6 Mhz range typically allocated per channel, however any suitable modulating scheme and media bitrate could be employed. Each assignment serving a subscriber request consumes this bandwidth according to the bitrate of the request. In a typical video services environment, a service group has either 4, 6, or 8 channels for serving several hundred subscribers, hence prudent management of the available bandwidth avoids denial of subscriber requests.

Figure 1:
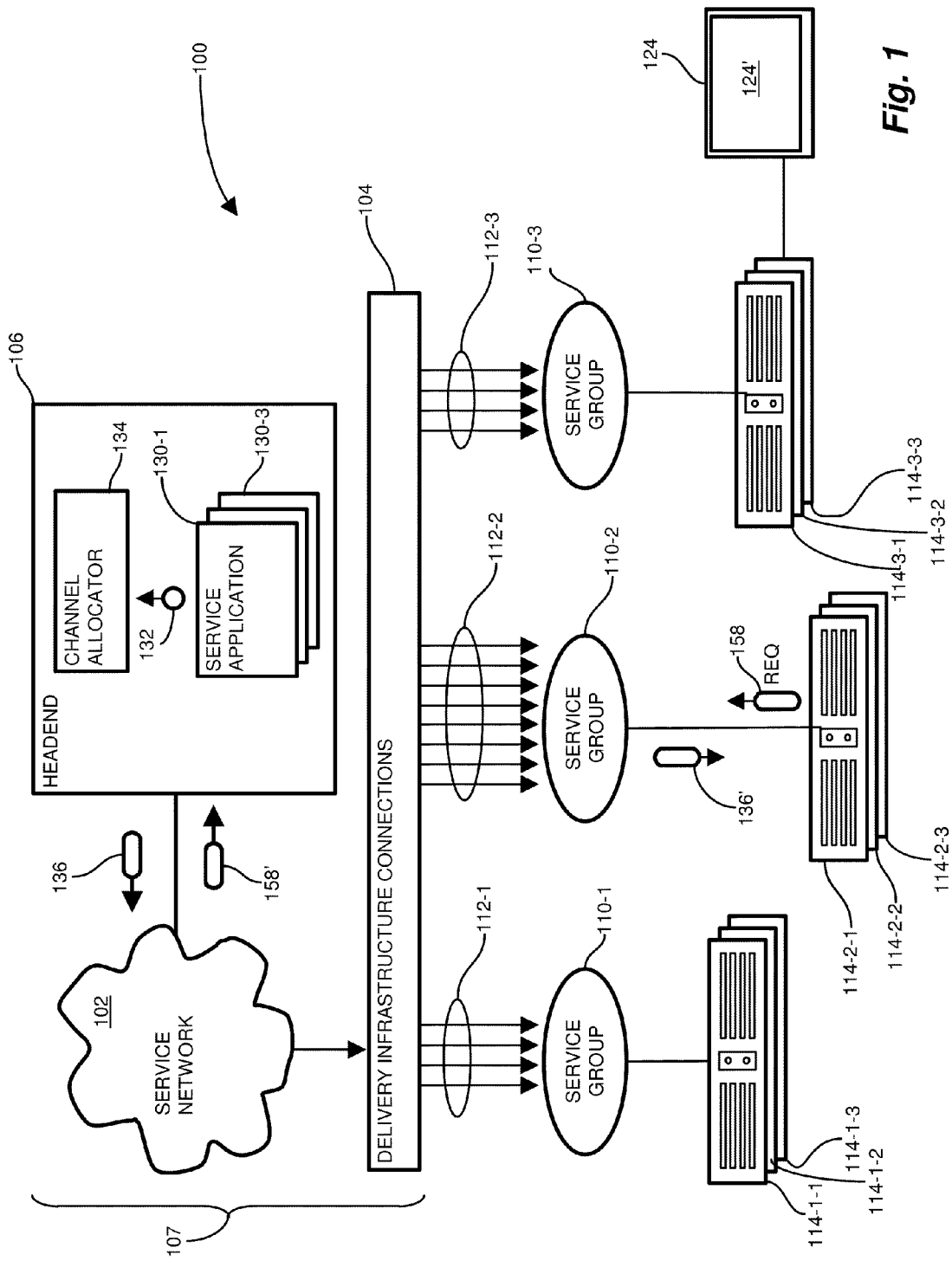
FIG. 1 is a context diagram of a video services environment suitable for use with configurations herein.

FIG. 1 is a context diagram of a video services environment 100 suitable for use with configurations disclosed herein. Referring to FIG. 1, the video services environment 100 includes a headend 106 and a service network 102 with delivery infrastructure connections 104 to individual service groups 110-1 ... 110-3 (110 generally). A service provider deploys the headends 106 based on geographic distribution of users for satisfying the user requests for services. The service network 102 may be any suitable transport network, such as Internet connections, fiber optic connections, TELCO lines and broadband lines, or a combination of these. The service network 102 transports a plurality of channels 112 emanating from the headend 106 for transport to the client devices 114 (e.g. settop boxes) for rendering the service 120. The transport network 102/104 connects to particular service groups 110 by connecting transport streams 112, or channels, of a particular bandwidth range to the client devices 114 of a particular service group 110. The delivery infrastructure connections 104 define a service drop to individual client devices such as settop boxes 114-1-1 ... 114-3-3 (114 generally) or other CPE device, typically via a fanning out of coaxial cable to homes of individual users.

Users issue a request 158 for services, typically using the settop box 114 and associated user interface. The request 158' is receivable by a service application 130-1 ... 130-3 (130 generally) based on the type of request, such as for VOD, SDV or 3D services. The application 130 sends a request 132 to a channel allocator 134 requesting a channel assignment for servicing the request 132. Each request 132 has a bitrate requirement and a settop box identifier indicating the bandwidth and destination for the service response 136, receivable by the settop box 114, typically as a stream of packets 136', for rendering the requested material 124' on a user device 124 (i.e. TV).

Figure 2:
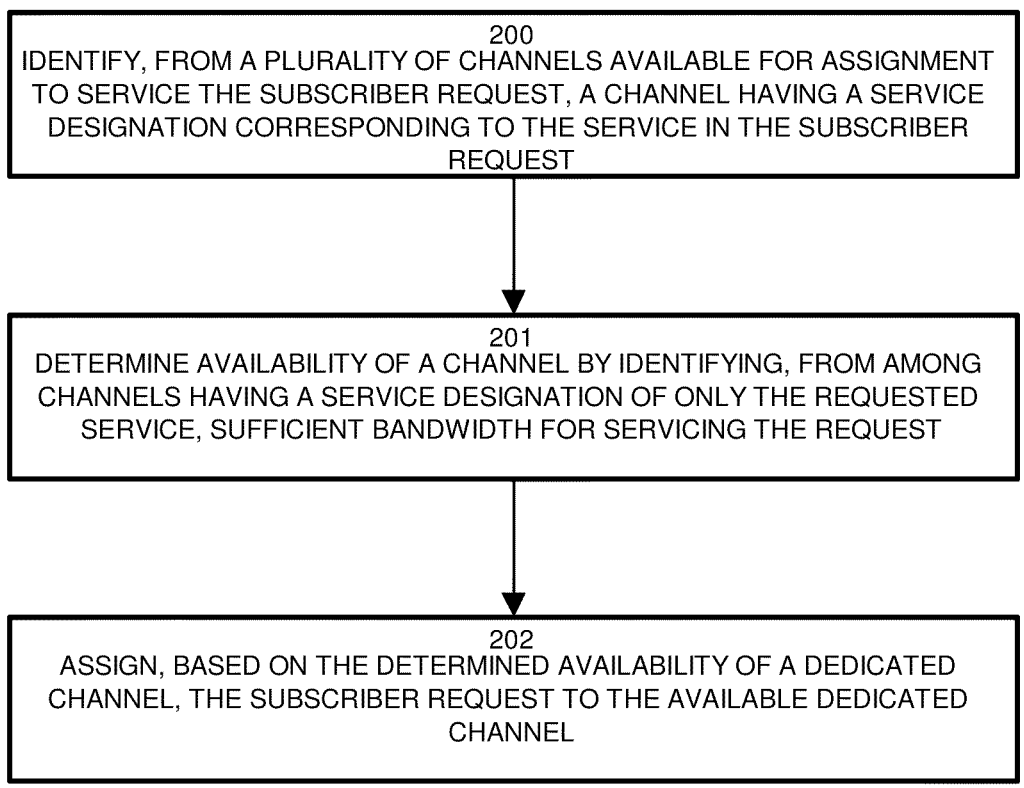
FIG. 2 is a flowchart of resource allocation in the environment of FIG. 1.

FIG. 2 is a flowchart of resource allocation in the environment of FIG. 1. Referring to FIGS. 1 and 2, in a video services delivery environment 100 for providing a plurality of video services in response to subscriber requests 158, configurations herein provide a system and method of assigning channels for servicing the requests by identifying, from a plurality of channels 112 available for assignment to service the subscriber request 158, in which each channel 112 has a service designation corresponding to the service in the subscriber request 158, as depicted at step 200. In contrast to conventional approaches, the service designation is indicative of the service or services which the channel 112 may carry, to provide optimal distribution of services to all users and avoid one service from disproportionately consuming channel bandwidth. The channel allocator 134, responsive to the user request 158' determines availability of a channel 112 by identifying, from among channels having a service designation of only the requested service, sufficient bandwidth for servicing the request, as shown at step 201. The allocator 134 assigns, based on the determined availability of a dedicated channel 112, the subscriber request 158 to the available dedicated channel 162, as depicted at step 202. As discussed further below, channel availability may be obtained from examination of channels with different service designations to find an appropriate match/availability.

Figure 3:
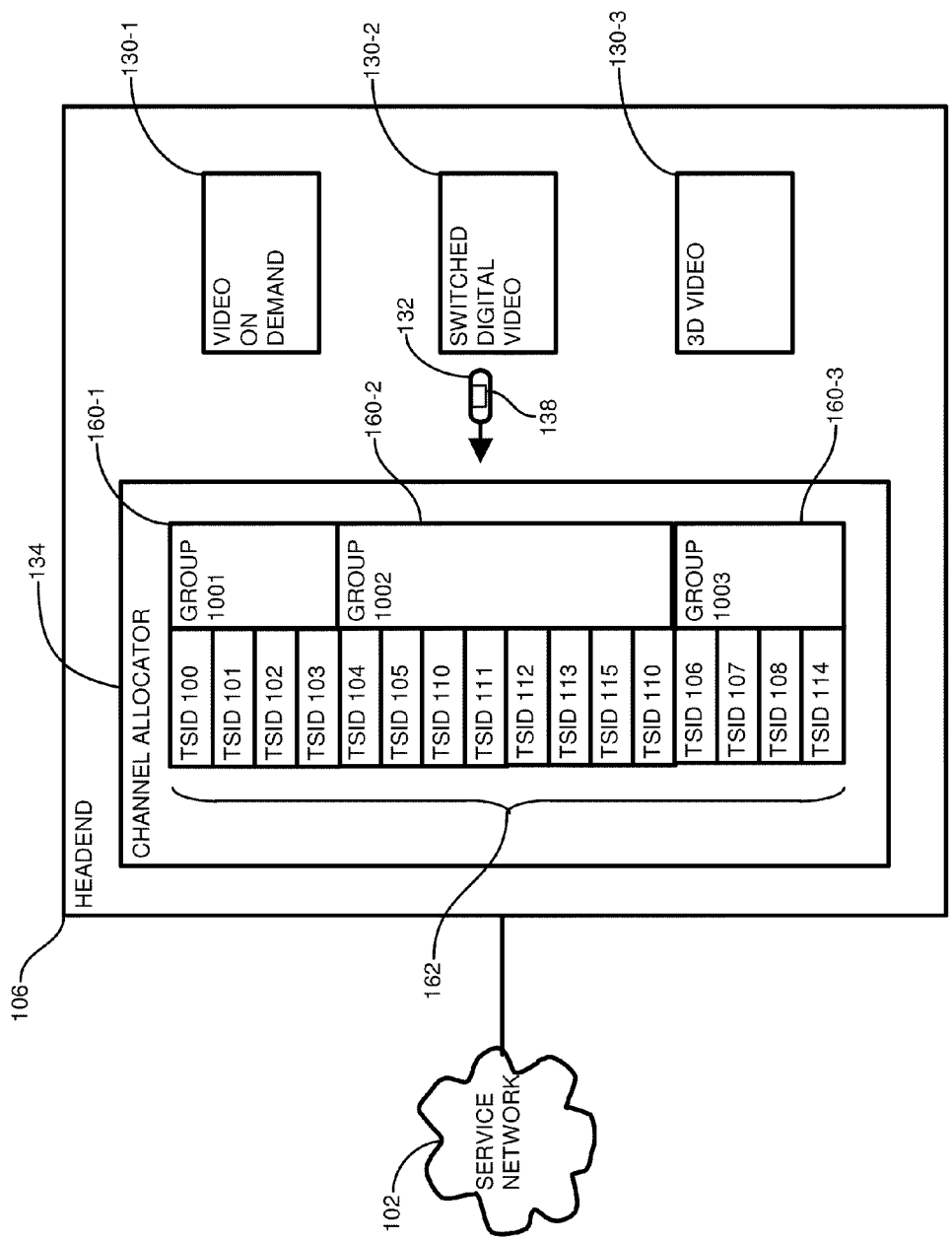
FIG. 3 is a block diagram of channel allocation according to FIG. 2.

FIG. 3 is a block diagram of channel allocation according to FIG. 2. Referring to FIG. 3, the headend 106 identifies channels by service group 110 and transport stream ID (TSID) 162. The channel allocator 134 maintains a mapping of each service group 160-1 ... 160-3 (160 generally) and the TSIDs 162 assigned for use by that group 160. Upon receiving the channel request 132, the channel allocator 134 reads the bitrate and settop ID 138 from the request 132, maps the settop ID to a service group 110, and selects a TSID 162 according to an allocating scheme described further below. The available bandwidth for the selected TSID 162 is then decremented by the bandwidth allocated for the duration of the service. Since the TSIDs 162 of the entire group 160 are shared for the requests 132, it is beneficial to allocate the requests 132 among the available TSIDs 162 so as to avoid small segments of unused bandwidth and rather, retain contiguous portions, or "chunks," of bandwidth large enough to handle the most demanding request 132. For example, a 3D request 158 expects a bitrate 138 of 38.4 Mbps, which effectively consumes an entire 35.8 Mbps channel (entire TSID allocation).

Conventional channel allocation schemes employed logic such as least loaded, which allocates each request to the channel 162 currently carrying the least load. This scheme provides that the burden is equally shared by the channels 162 and each remains at a roughly similar level of utilization. This conventional approach fails to recognize that some services, such as HD and 3D, require larger portions of contiguous bandwidth in the assigned channel 162. Thus, such load balancing can result in an unused "bubble" of capacity in each of several channels which is unable to satisfy an incoming request, even though the total aggregate bandwidth is sufficient to carry the request.

A popular solution to the high definition content problem is to leave enough bandwidth on each delivery channel to support high definition content, for example. Bandwidth allocations are assigned to the least loaded delivery channel until that allocation would cause the delivery channel to have less bandwidth than the bandwidth required for HD content. At that point, the bandwidth allocation algorithm places content on the most loaded delivery channel that has sufficient bandwidth for the new session.

New content formats continue to be released that increase the amount of bandwidth required to deliver content. High definition MPEG-2 content requires 12.0-19.2 Mbps. Thus, a QAM256 channel can only carry 2-3 HD MPEG-2 programs. A major content provider recently announced that a 3D HD program will require a full 6 MHz analog channel. That is, it will require 38.8 Mbps of bandwidth, which is the full capacity of QAM 256.

For bandwidth limited delivery channels 162, it is beneficial to have a bandwidth allocation mechanism that allows these 3D and HD programs to be delivered to the subscriber. Mechanisms that attempt to load balance resources on the distribution channels (e.g. QAMs) may not be capable for delivery of 3D content even if large amounts of aggregate bandwidth are available. For example, suppose a service group uses 4 QAMs for video on demand content delivery. Four 3.75 Mbps SD programs are load balanced across the QAMs. Each QAM has over 35 Mbps of available bandwidth, for a total of over 140 Mbps. However, bandwidth allocation for a 3D program will fail since no QAM has a full 38.8 Mbps of bandwidth free.

One approach is block allocation. The block allocation scheme segments a delivery channel into bandwidth blocks. The bandwidth blocks are typically the size of the largest content item. This results in the creation of two or more bandwidth blocks per delivery channel. The last bandwidth block in a delivery channel may be smaller than the largest content item if the bandwidth of the delivery channel is not an integer multiple of the bandwidth of the largest content item.

For example, a QAM 256 channel has a bandwidth of 38.8 Mbps. If the largest content item is a 15 Mbps HD MPEG-2 program, then the QAM channel is segmented into 3 bandwidth blocks. Two bandwidth blocks are 15 Mbps in size and the last one is 8.8 Mbps in size.

The block allocation algorithm attempts to place a new request into a bandwidth block with existing allocations without crossing the block boundary into the next block. If no delivery channels have bandwidth blocks with sufficient bandwidth for the new session request, the block allocation algorithm starts filling an empty block on the least loaded QAM 162.

Figure 4:
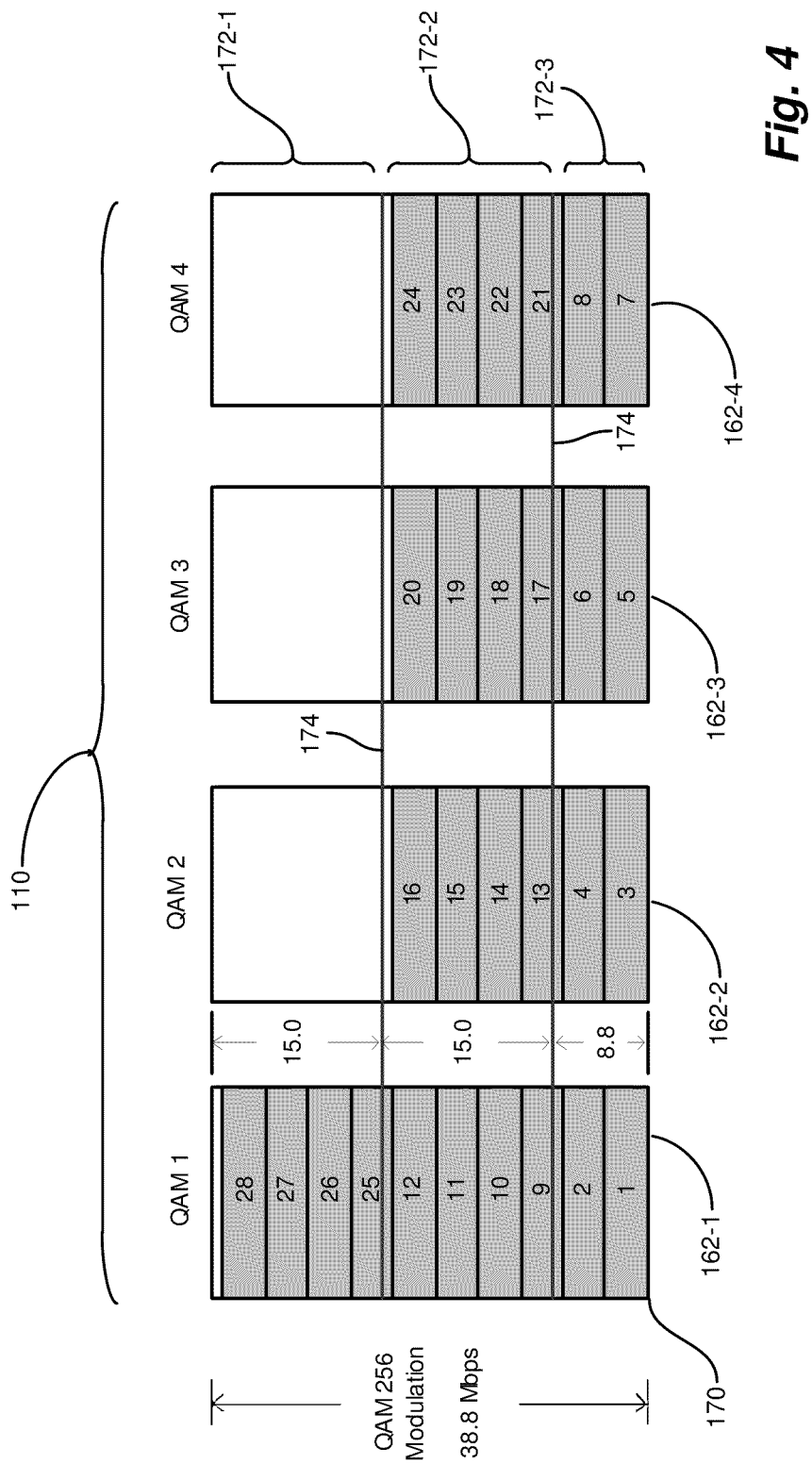
FIG. 4 shows an allocation threshold in the channels of FIG. 3.

FIG. 4 shows an allocation threshold in the channels of FIG. 3. Referring to FIGS. 3 and 4, this allocation scheme assigns bandwidth in chunks 170, leaving large portions (i.e. multiple blocks) available for high bit rate content. As a block is filled, subsequent requests are load balanced to the least loaded QAM. FIG. 4 shows a VOD service group with 4 QAMs (channels) 162-1 . . . 162-4. Each QAM 162 has 38.8 Mbps of bandwidth. The block 172 size is 15 Mbps, resulting in 3 bandwidth blocks per QAM. Two blocks 172-1, 172-2 are 15 Mbps in size and one (172-3) is 8.8 Mbps in size. Assuming twenty eight 3.75 Mbps SD content allocations, FIG. 4 shows the order in which the bandwidth will be assigned to each of the QAMs 162.

In this example, the first allocation is assigned to the 8.8 Mbps block 172-3 on QAM 1. Since the next allocation fits in the 8.8 Mbps block 172-3 on QAM 1 without exceeding the 8.8 Mbps block capacity, the second allocation is assigned to QAM 1 also. The third allocation does not fit within the 8.8 Mbps block on QAM 1. There is only 1.3 Mbps of bandwidth available to that block (8.8−2×3.75). Since the third allocation will cross a block boundary 174 on any of the QAMs (block on QAM 1 is full, no allocations on other QAMs), the channel allocator 134 assigns the bandwidth to the least loaded QAM 162. In this case, it is assigned to the 8.8 Mbps block 172-3 on QAM 2.

For the example in FIG. 4, even with 28 SD allocations, there are three blocks of over 15 Mbps available. Each of these can carry 15 Mbps HD content. Thus, this scheme is designed to leave blocks available for high bit rate content, yet spread the load across the available delivery channels 162.

Dedicated delivery channels, sometimes referred to as "silos", are typically used to segregate different services in a network. For example, video on demand and switched digital video (SDV) are two different services offered by cable operators. In a typical deployment, both VOD and SDV use delivery channels 162 dedicated to that service.

Dedicated channel designation prevents one service from using all of the resources and "starving" the other service. One example of starvation is most or all bandwidth on a set of QAMs shared across services is used by one of the two services. A more interesting starvation is the case of load balancing requests across delivery channels. High bit rate content, such as 3D content, will not have sufficient bandwidth even if only a small number of other services are currently being delivered, as discussed above.

If service definitions are configurable, then the pool of delivery channels can be allocated to different services based on usage patterns and the desire to prevent resource starvation. For example, 3D MPEG2 VOD content is considered a VOD service. However, if the system was configured such that it is a separate service with dedicated QAMs, then the 3D MPEG-2 VOD content would not be starved for resources, which is the case if there is at least one VOD service on each of the VOD QAMs 162. In other words, the service definitions dedicate a channel to a service, even if different formats having different bitrates are available within the service.

In contrast, multiple services may be configured to share delivery channels. The reason is that service usage may peak at different times of the day. Instead of dedicating resources, which results in inefficiencies in bandwidth allocation, use of the same set of delivery channels may reduce the overall number of delivery channels required by those services.

Figure 5:
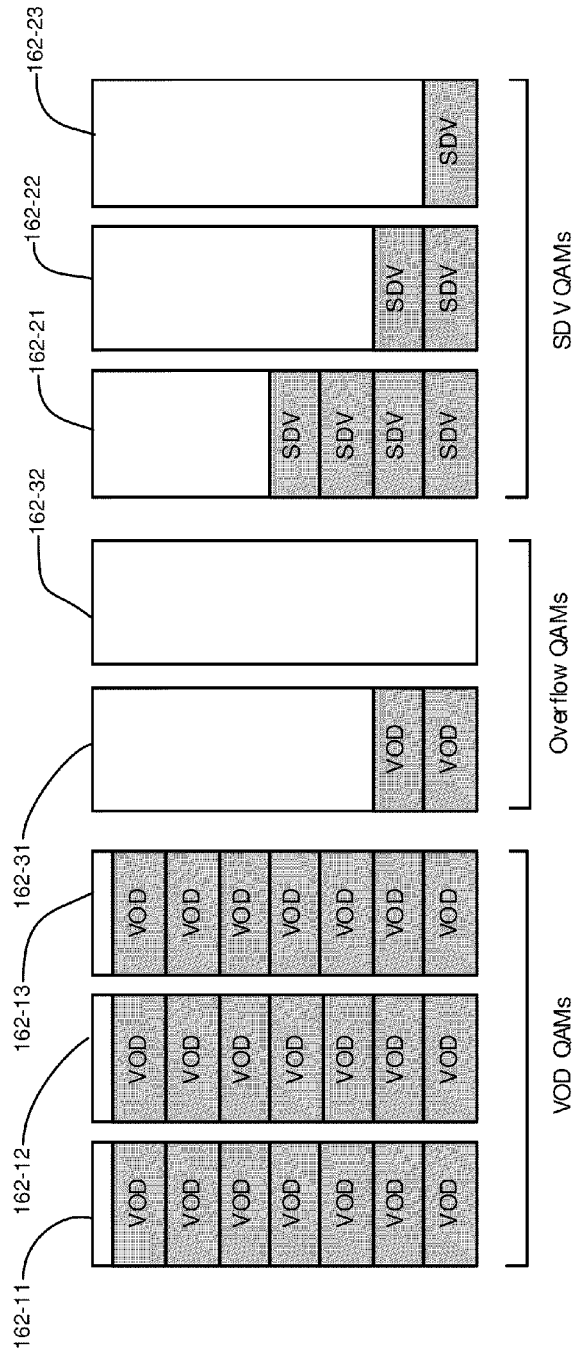
FIG. 5 shows overflow channels employable with the channels in FIG. 4.

FIG. 5 shows overflow channels employable with the channels in FIG. 4. The concepts of dedicated delivery channels and shared delivery channels are combined to create an overflow delivery channel. In this case, a set of delivery channels 162 are dedicated to each service. However, a set of delivery channels 162 exist that are shared among multiple services. All allocations are initially assigned to the dedicated delivery channels. If one service becomes overloaded, it can use the bandwidth on a shared delivery channel 162 to augment the bandwidth dedicated to that service. Referring to FIG. 5, three channels 162-11 . . . 162-13 are dedicated to providing VOD service, and 3 channels 162-21 . . . 162-23 are dedicated to providing SDV. Therefore, neither VOD nor SDV alone can consume all available channels 162. Further, two shared channels 162-31, 162-32 are shared between and available for either VOD or SDV services (shown as two chunks in 162-31 assigned for VOD). Thus, once either service has assigned dedicated channels 162 it may then begin assigning the shared channels; as long as both services did not exhaust the shared channels 162-31, 32, requests would continue to be fulfilled.

This approach prevents a service from being starved of resources since there are always a set of delivery channels 162 dedicated to that service. However, it also allows consolidation of some of the delivery channels 162 so that the operator does not need to dedicate delivery channels based on peak usage. If services have peak usage at different times, then they can share some of the delivery channels.

This concept is extended by a reserve channel. A reserved channel 162 is similar to an overflow delivery channel, but it applies within a set of delivery channels dedicated to a service. The concept is that one or more delivery channels will not be used until there is insufficient bandwidth on all of the other delivery channels dedicated to that service. Thus, bandwidth allocation requests are load balanced across the non-reserved delivery channels. When a request 132 arrives that requires more bandwidth 138 than is available on the non-reserved delivery channels, then a reserved delivery channel will be used.

Allocation on reserved delivery channels use the most loaded allocation method. Thus, if a subsequent allocation is required on a reserved delivery channel, it will use the reserved delivery channel on which a bandwidth allocation already exists. This leaves the other reserved delivery channels unused. One feature of reserved delivery channels is to leave a large block of bandwidth unallocated in case a very high bandwidth service request may be received. An example is 3D HD MPEG 2 video. The operator may not want to dedicate delivery channels to this content. However, during non-peak times, the operator may want to keep some delivery channels unused in case a request for this content is received.

Figure 6:
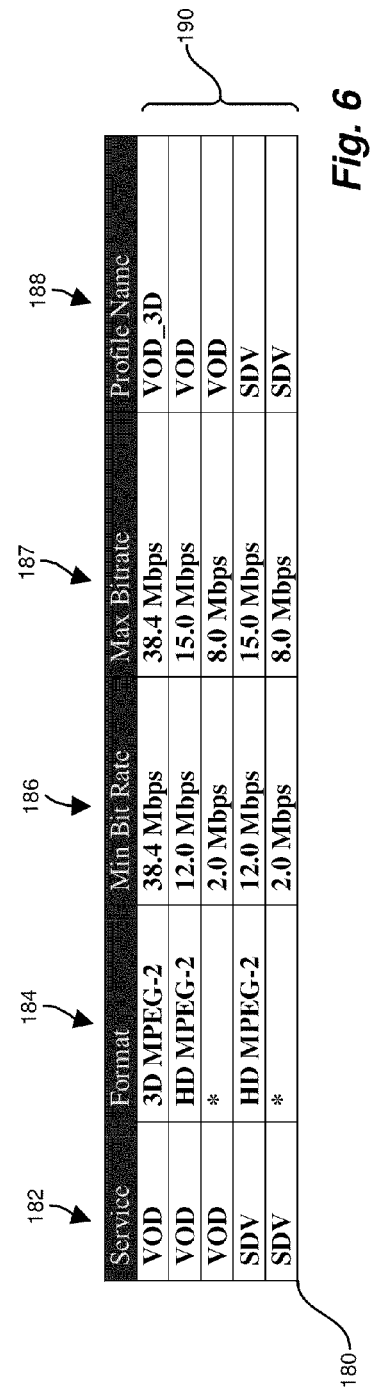
FIG. 6 shows a service profile applicable to the channels in FIG. 3.

FIG. 6 shows a service profile applicable to the channels in FIG. 3. A service profile bandwidth allocation scheme is designed to support a mixture of low bit rate, high bit rate, and extremely high bit rate content (e.g. 3D) content. One feature is to maximize service delivery while supporting multiple service types and content bit rates. A secondary goal is to minimize service outage due to delivery channel failure. The bandwidth allocation scheme uses a number of techniques including:

both dedicated and overflow delivery channels
reserved delivery channels
different bandwidth allocation techniques based on the properties of the delivery channel.

Using a service profile table 180 a configuration setup defines all of the services 182 available to the subscriber, such as VOD, SDV and 3D. The services 182 may be further classified by the encoding formats 184 or other service characteristics, to identify different bitrates for delivering the same service (i.e. SD and HD formats). For example, the system may differentiate 3D MPEG-2 VOD from HD MPEG-2 VOD. For each service 182 classification, profile table 180 defines the expected minimum 186 and maximum 187 bit rate of the content, along with the encoding format (format) 184 and a reference name 188 to define a profile 190. Each entry 190-1 . . . 190-5 in the profile table 180 defines the parameters for each service in response to a service request 158. A profile entry 190 may employ an asterisk as a wildcard. It is a catch-all to match all other formats for a given service 182. The profile table 180 also defines a "catch all" for VOD to support any other encoding format (such as SD MPEG-2, HD MPEG-4, etc.).

FIG. 7 shows mapping of service profiles of FIG. 6 to channels. The headend 106 maps one or more profiles 190 to each channel 162 to indicate the requests it may carry. A mapping table 191 shows an example cable system that assigns service profiles 190 to downstream QAMs 162. Multiple service profiles 190 can be assigned to a single QAM by specifying multiple profile names 188. The mapping table 191 specifies, for each channel in a group 160, the QAM name 92, which typically includes the TSID, the TSID identifier 93, the frequency range employed 94, the names 188 of assigned (mapped) profiles 95, and whether the channel is reserved 96. In this example, 1 QAM (195-1) is always dedicated to VOD_3D to ensure resources are always available to the extremely high bit rate content. Four QAMs 195-2 . . . 195-5 are shared between all VOD services types. One of these QAMs 195-2 is reserved, so it is kept unused in case requests are received for the 3D content and the QAM dedicated to 3D content is in use. Two QAMs 195-8, 195-9 are dedicated to SDV, and two QAMs 195-6, 195-7 are overflow QAMs and support both the VOD and SDV services.

FIG. 8 shows templates for mapping service profiles to channels. Referring to FIGS. 1 and 8, in a large services environment 100, there may be many service groups 110, each assigned a set of channels 112. However, each service group 110 typically carries the same mix of delivery channel 162 to service 182 assignments. Configuration can be simplified by defining the mix of service profiles 190 in a given service group 110 as a service profile template 80. The template 80 consists of a QAM count 81 specifying the number of delivery channels in a set, the set of service profiles 82 for that set of delivery channels, and the number of delivery channels to designate as reserved delivery channels 83. A startup or initialization sequence is invoked to generate the channel mapping 191 by iterating through the channels 162 of each group 110 and generating mapping entries 195 based on the template 80.

Figure 9:
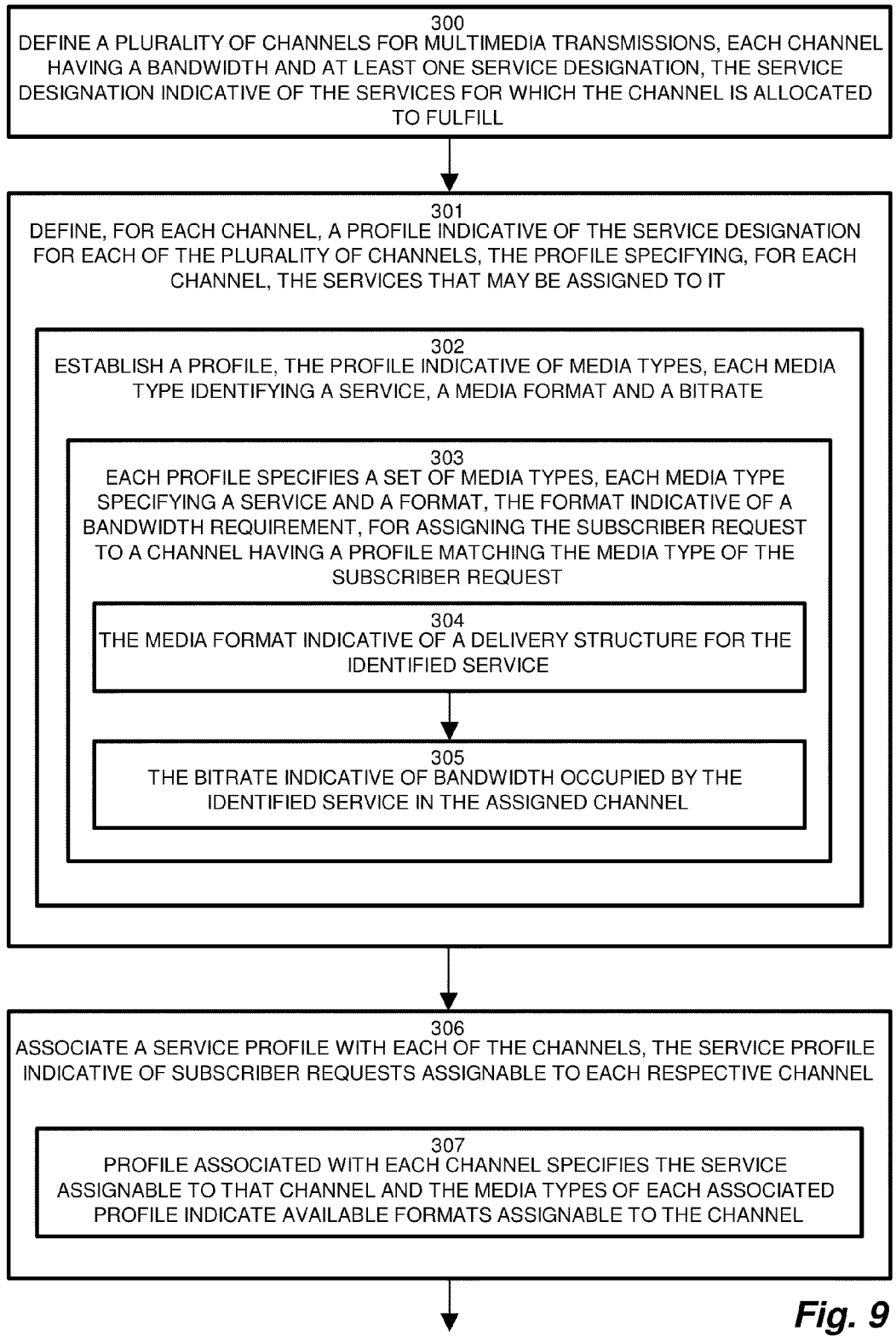
FIGS. 9-11 are a flowchart of channel allocation using profiles as in FIGS. 3-8.
Figure 10:
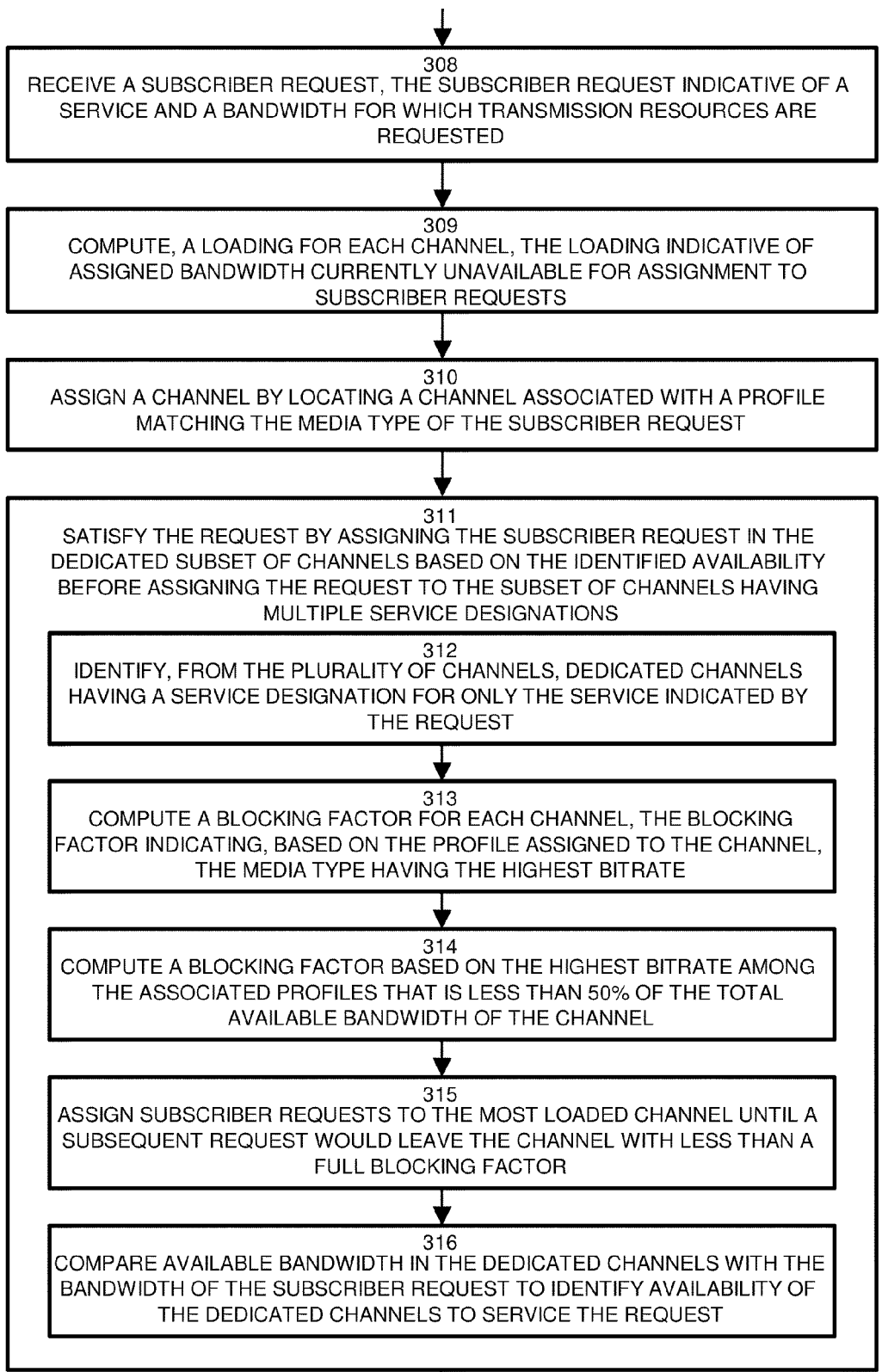
Figure 11:
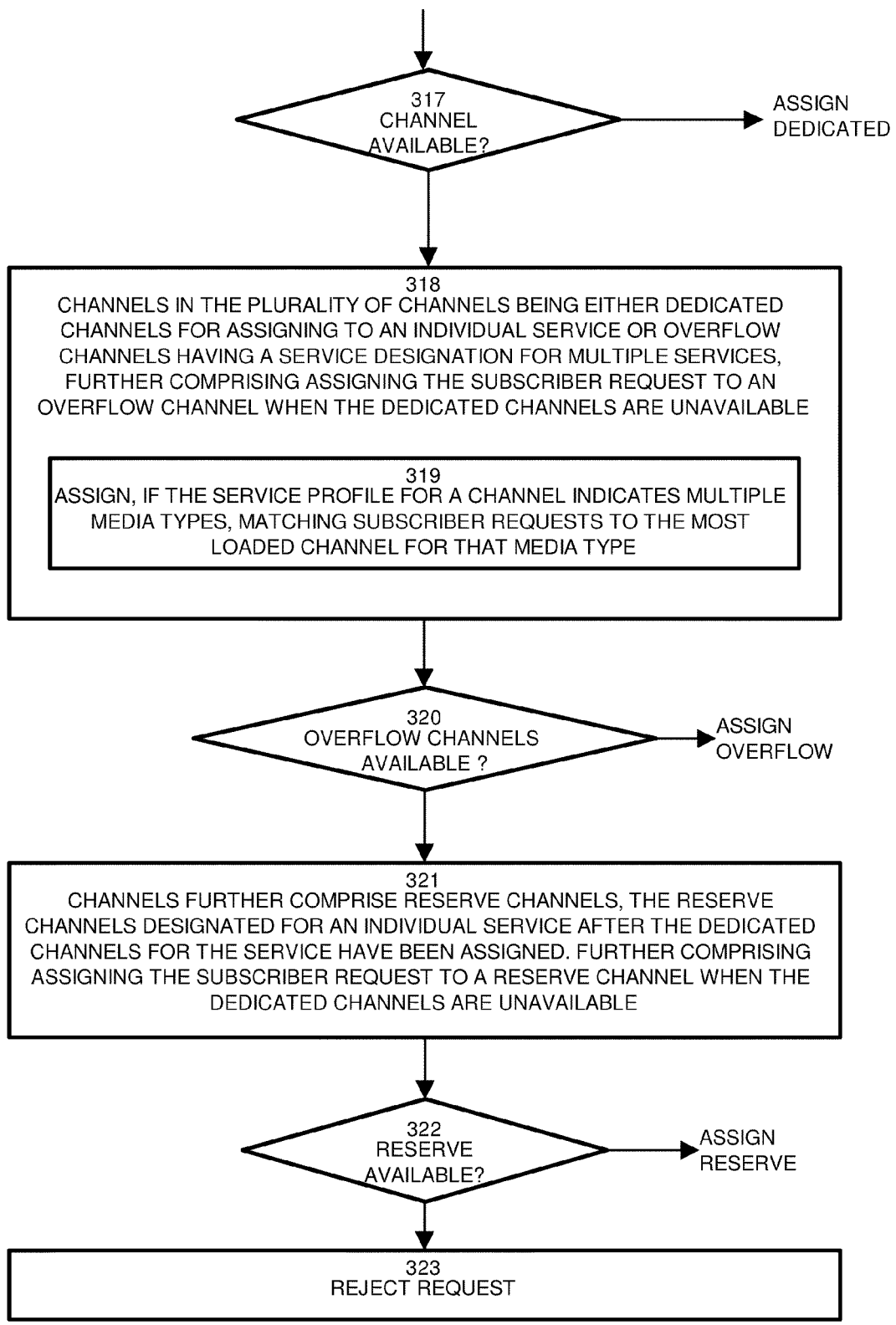

FIGS. 9-11 are a flowchart of channel allocation using profiles as in FIGS. 3-8. Referring to FIGS. 3-11, an example of channel profile assignment and deployment as discussed above is discussed; alternate assignment and mapping schemes may be envisioned using the principles disclosed above. In the example configuration depicted below, whether the operator maps service profiles 190 to individual delivery channels or whether the operator uses a service profile template 80, each delivery channel 162 will be assigned to handle one or more services and a delivery channel may or may not be marked as reserved 96.

If multiple distinct service types 182 (such as VOD and SDV) are assigned to a delivery channel 162, that delivery channel 162 will be an overflow delivery channel. Overflow delivery channels use the most loaded scheme for bandwidth allocation. This tends to leave large blocks of unused bandwidth across the other overflow delivery channels. Since the overflow delivery channels not used until there is a lack of bandwidth on the dedicated delivery channels, a failed overflow delivery channel will impact only a small subset of the subscribers receiving that service.

All other delivery channels are dedicated delivery channels since they carry only one primary service type. Note that multiple formats for that service type may be on the delivery channel (such as HD MPEG-2 VOD and SD MPEG-2 VOD); however delivery channels all carry the same primary service type (e.g. VOD). Dedicated delivery channels use the Block Allocation Algorithm for bandwidth allocation. Referring to FIGS. 1, 3 and 9-11, at step 300, the method of assigning video transmission resources as disclosed herein includes defining a plurality of channels 162 for multimedia transmissions, in which each channel has a bandwidth (38.8 Mbps for 256 QAM) and at least one service designation (such as VOD, SDV or 3D), such that the service designation is indicative of the services 182 for which the channel is allocated to fulfill. A headend (video server) 106 or operator defines, for each channel 162, a profile 190 indicative of the service designation 95 for each of the plurality of channels 162, in which the profile 190 specifies, for each channel 162, the services 182 that may be assigned to it, as depicted at step 301. This includes establishing the profile 180, such that the profile 180 is indicative of media types, each media type identifying a service 182, a media format 184 and a bitrate 186, 187, as disclosed at step 302. In the example arrangement shown, each profile 180 specifies a set of media types 190, each media type specifying a service 182 and a format 184, in which the format is indicative of a bandwidth 186 requirement, for assigning the subscriber request 158 to a channel having 162 a profile 190 matching the media type of the subscriber request, as depicted at step 303. The media format 184 is indicative of a delivery structure for the identified service, typically specifying an encoding format or protocol such as 2D or 3D MPEG, as disclosed at step 304, and the bitrate indicates the bandwidth occupied by the identified service in the assigned channel 162, as disclosed at step 305. Each profile entry 190 may specify a range such as a minimum 186 and maximum 187 bit rate typically consumed by the format; the actual bandwidth is identified in the request 132. The bandwidth range in the table is used to classify the content into a specific profile. This allows the allocation scheme to determine the profile to apply; either of these or a permutation such as an average may be take as the bandwidth consumed.

Upon defining the profile table 180, the headend 106 associates one or more service profiles 190 (profile entry) with each of the channels 162, such that the service profile is indicative of subscriber requests 132 assignable to each respective channel 162, as depicted at step 306. The profile(s) 190 associated with each channel 162 specifies the service 182 assignable to that channel 92 and the media types of each associated profile 190 indicate available formats 184 assignable to the channel 162, as depicted at step 307.

Upon user operation, an application 130 at the headend 106 receives a subscriber request 158, in which the subscriber request 158 is indicative of a service 182 and a bandwidth for which transmission resources are requested, as shown at step 308. The channel allocator 134 computes a loading for each channel 162, such that the loading is indicative of assigned bandwidth currently unavailable for assignment to subscriber requests 158, as shown at step 309. Since each settop box 114 sending the requests 158 belongs to a service group 110, the channel allocator 134 considers channels allocated to that group 160. The channel allocator 134 assigns a channel 162 by locating a channel 162 associated with a profile 190 matching the media type of the subscriber request, as shown at step 310. This may be performed by parsing the profile table 180 for the group to identify a first matching entry, or wildcard, corresponding to the format 184 indicated in the request.

The channel allocator 134 satisfies the request 132 by assigning the subscriber request in the dedicated subset of channels 162 (i.e. dedicated channels) based on the identified availability before assigning the request to the subset of channels 152 having multiple service designations (i.e. overflow channels), as disclosed at step 311. The channel allocator 134 therefore prioritizes checks according to dedicated channels, then overflow channels, and reserve channels. The channel allocator 134 identifies, from the plurality of channels, dedicated channels having a service designation for only the service indicated by the request 132, as shown by step 312. Thus, if a channel is a dedicated channel, it will field the requests for matching service before burdening the shared (overflow) channels designated by a profile entry 190 specifying multiple services. In the example configuration depicted, in contrast to the overflow channels profiled for multiple media types, the dedicated channels employ block allocation which attempts to assign requests to bandwidth blocks having existing allocations without crossing a block boundary into the next allocation block. The overflow and reserve channels, as discussed further below, employ most loaded allocation which attempts to assign a channel that has the least bandwidth remaining that is still sufficient to accommodate the bitrate of the request.

Continuing at step 313, the channel allocator 134 computes a blocking factor for each channel 162 such that the blocking factor indicates, based on the profile 190 assigned to the channel 162, the media type having the highest bitrate. In the example arrangement, the channel allocator 134 computes a blocking factor based on the highest bitrate among the associated profiles 95 that is less than 50% of the total available bandwidth of the channel 162 to identify a block size 172 appropriate for the channel 162, as depicted at step 314. Since an available portion insufficient to satisfy a request remains an unused "bubble" in the channel 162, an allocation which requires more than 50% of the entire channel bandwidth effectively requires the entire channel, as a second similarly sized request cannot be accommodated. Accordingly, the channel allocator 134 assigns the subscriber requests 132 to the most loaded channel 162 until a subsequent request 158 would leave the channel 162 with less than a full blocking factor, as disclosed at step 315. The channel allocator 134 compares available bandwidth in the dedicated channels 162 with the bandwidth of the subscriber request 138 to identify availability of the dedicated channels 162 to service the request, as disclosed at step 316. A check is performed at step 317, to identify an available dedicated channel, and the channel 162 is so allocated if available If no dedicated channel is available, in which the channels in the plurality of channels are either dedicated channels for assigning to an individual service or overflow channels having a service designation for multiple services, the channel allocator 134 attempts to assign the subscriber request 132 to an overflow channel 162 when the dedicated channels are unavailable, as depicted at step 318. Therefore, the channel allocator 134 assigns, if the service profile 190 for a channel 162 indicates multiple media types, matching subscriber requests to the most loaded channel for that media type, as shown at step 319. A check is performed, to determine if overflow channels 162 are available to satisfy the request, as depicted at step 320, and an overflow channel assigned if available.

If an overflow channel is not available, the channels further comprise reserve channels, such that the reserve channels are designated for an individual service after the dedicated channels for the service have been assigned. The channel allocator attempts to assign the subscriber request to a reserve channel when the dedicated channels are unavailable, as disclosed at step 321, and a check is performed at step 322 to identify if a reserve channel 162 is available. The reserve channel, if available, is assigned, otherwise the request fails.

Those skilled in the art should readily appreciate that the programs and methods for multi-service bandwidth allocation as defined herein are deliverable to a user processing and rendering device in many forms, including but not limited to a) information permanently stored on non-writeable storage media such as ROM devices, b) information alterably stored on writeable non-transitory storage media such as floppy disks, magnetic tapes, CDs, RAM devices, and other magnetic and optical media, or c) information conveyed to a computer through communication media, as in an electronic network such as the Internet or telephone modem lines. The operations and methods may be implemented in a software executable object or as a set of encoded instructions for execution by a processor responsive to the instructions. Alternatively, the operations and methods disclosed herein may be embodied in whole or in part using hardware components, such as Application Specific Integrated Circuits (ASICs), Field Programmable Gate Arrays (FPGAs), state machines, controllers or other hardware components or devices, or a combination of hardware, software, and firmware components.

While the system and method of multi-service bandwidth allocation has been particularly shown and described with references to embodiments thereof, it will be understood by those skilled in the art that various changes in form and details may be made therein without departing from the scope of the invention encompassed by the appended claims.

What is claimed is:

1. A method comprising:
receiving a subscriber request, at a headend, from a customer premises equipment (CPE) for a service in a video services delivery environment, wherein the video services delivery environment includes a first group of channels, a second group of channels, and at least one overflow channel, the first group of channels being for services in which each of the services do not take up more than half of a bandwidth on a channel in the first group of channels and the second group of channels being for services in which each of the services take up more than half of the bandwidth on a channel in the second group of channels;
identifying, by the headend, from a plurality of channels available for assignment to the service from the subscriber request, two or more candidate channels having a service designation corresponding to the service from the subscriber request, wherein the service designation is indicative of a service or services that each channel can carry, and wherein the two or more candidate channels include at least one dedicated service channel from the first group of channels or from the second group of channels and the at least one overflow channel;

determining, by the headend, availability of each of the two or more candidate channels by identifying which of the two or more candidate channels have sufficient bandwidth for servicing the request;

assigning, by the headend, the subscriber request to an available dedicated service channel when the dedicated service channel is available, wherein the dedicated service channel is associated with a profile indicative of a single video media type that corresponds to the service from the subscriber request, wherein the dedicated service channel is dedicated to deliver a video service for a highest expected bandwidth request in the video services delivery environment;

assigning, by the headend, the subscriber request to an overflow channel when the dedicated service channel is not available, wherein the overflow channel is associated with a profile indicative of multiple video media types; and communicating, by the headend, the service from the subscriber request to the CPE via the assigned channel.

2. The method of claim 1 wherein the dedicated service channel is dedicated for the assignment of an individual video service and the overflow channel is for the assignment of multiple video services.

3. The method of claim 1 wherein the plurality of channels further comprise reserve channels, the reserve channels designated for an individual service, the method further comprising assigning the subscriber request to a reserve channel when the channel associated with the profile of multiple media types is unavailable.

4. The method of claim 1 further comprising defining the profile, for each channel in the plurality of channels, such that the profile is indicative of the service designation for each of the plurality of channels, the profile specifying, for each channel, the services that may be assigned to it.

5. The method of claim 4 wherein the profile for each channel specifies a set of media types, each media type specifying a service and a format, the format indicative of a bandwidth requirement, and assigning the subscriber request to one of the plurality of channels whose profile matches the media type of the subscriber request.

6. The method of claim 1 further comprising:
establishing a service profile indicative of media types, each media type identifying a service, a media format and a bitrate, the media format indicative of a delivery structure for the identified service, and
the bitrate indicative of bandwidth occupied by the identified service in the assigned channel; and
associating the service profile with each of the plurality of channels, the service profile indicative of subscriber requests assignable to each respective channel;
locating one of the plurality of channels associated with the service profile matching the media type of the subscriber request; and
assigning the channel associated with the profile matching the media type of the subscriber request.

7. The method of claim 6 wherein the service profile associated with each channel specifies the service assignable to that channel and the media types of each associated profile indicate available formats assignable to the channel.

8. The method of claim 6 further comprising:
computing, a loading for each channel of the plurality of channels, the loading indicative of assigned bandwidth currently unavailable for assignment to subscriber requests;
assigning, if the service profile for one of the plurality of channels indicates multiple media types, matching subscriber requests to the most loaded channel for that media type; and
assigning, if the service profile for one of the plurality of channels indicates a single media type, matching subscriber requests to an available block of bandwidth without crossing a block boundary into another block, wherein the block size is based on the bitrate.

9. The method of claim 6 further comprising:
computing a blocking factor for each dedicated service channel, the blocking factor indicating, based on the profile assigned to the dedicated service channel, the media type having the highest bitrate; and
assigning subscriber requests to a most loaded channel until a subsequent request would leave the most loaded channel with less than a full blocking factor.

10. The method of claim 9 further comprising computing the blocking factor based on the highest bitrate among the associated profiles that is less than 50% of a total available bandwidth of each dedicated service channel.

11. A video services delivery server for providing a plurality of video services in response to subscriber requests, a method of assigning channels for servicing the requests comprising:
receiving a subscriber request, at a headend, from a customer premises equipment (CPE) for a service in a video services delivery environment, wherein the video services delivery environment includes a first group of channels, a second group of channels, and at least one overflow channel, the first group of channels being for services in which each of the services do not take up more than half of a bandwidth on a channel in the first group of channels and the second group of channels being for services in which each of the services take up more than half of the bandwidth on a channel in the second group of channels;
identifying, by the headend, from a plurality of channels available for assignment to the service from the subscriber request, two or more candidate channels having a service designation corresponding to the service from the subscriber request, wherein the service designation is indicative of the video service or services that each channel can carry, and wherein the two or more candidate channels include at least one dedicated service channel from the first group of channels or from the second group of channels and the at least one overflow channel;
determining, by the headend, availability of each of the two or more candidate channels by identifying which of the two or more candidate channels have sufficient bandwidth for servicing the request;
assigning, by the headend, based on the determined availability of a dedicated service channel from the at least one dedicated service channels, the subscriber request to the available dedicated service channel before assigning the subscriber request to an overflow channel from the at least one overflow channels, wherein the dedicated service channel is dedicated to deliver a video service for a highest expected bandwidth request in the video services delivery environment, wherein each overflow channel is associated with a channel profile of multiple media types; and
communicating, by the headend, the service from the subscriber request to the CPE via the assigned channel.

12. The server of claim 11 wherein each channel in the plurality of channels is either a dedicated service channel for assigning to an individual video service or an overflow channel having a service designation for multiple video services.

13. The server of claim 11 wherein the plurality of channels further comprise reserve channels, the reserve channels designated for an individual service and further comprising assigning the subscriber request to a reserve channel when the overflow channel is unavailable.

14. The server of claim 11 further comprising a profile table defining the profile, for each channel in the plurality of channels, such that the profile is indicative of the service designation for each of the plurality of channels, the profile specifying, for each channel, the services that may be assigned to it.

15. The server of claim 14 wherein each profile specifies a set of media types, each media type specifying a service and a format, the format indicative of a bandwidth requirement, and assigning the subscriber request to one of the plurality of channels whose profile matches the media type of the subscriber request.

16. In a video services delivery environment for providing a plurality of video services in response to subscriber requests, a method of assigning video transmission resources comprising:
   defining, by a headend, a plurality of channels for multimedia transmissions, wherein the plurality of channels includes a first group of channels, a second group of channels, at least one overflow channel, and at least one reserve channel, the first group of channels being for services in which each of the services do not take up more than half of a bandwidth on a channel in the first group of channels and the second group of channels being for services in which each of the services take up more than half of the bandwidth on a channel in the second group of channels, each channel having at least one service designation, the service designation indicative of the services for which the channel is allocated to fulfill;
   receiving a subscriber request, at the headend, from a customer premises equipment (CPE), the subscriber request indicative of a service and a bandwidth for which transmission resources are requested;
   identifying, by the headend, from the plurality of channels, at least one dedicated channel from the first group of channels or from the second group of channels having a service designation for only the service indicated by the request, wherein the at least one dedicated channel is dedicated to deliver a video service for a highest expected bandwidth request in the video services delivery environment;
   identifying, by the headend, from the plurality of channels, the at least one overflow channel having a service designation for multiple services, and the at least one reserve channel having a designation for a reserved service;
   comparing, by the headend, available bandwidth in the at least one dedicated channel with the bandwidth of the subscriber request to identify availability of the at least one dedicated channel to service the request;
   assigning, by the headend, the subscriber request to the at least one dedicated channel having a service designation for only the service indicated by the request when one of the dedicated channel is available, assigning the subscriber request to an overflow channel when the at least one dedicated channel is not available, and assigning the subscriber request to the at least one reserve channel when both the at least one dedicated channel and the at least one overflow channel is not available; and
   communicating, by the headend, the service from the subscriber request to the CPE via the assigned channel.

17. The method of claim 16 further comprising:
   establishing a service profile for each channel in the plurality of channels, the service profile indicative of media types, each media type identifying a service, a media format and a bitrate, the media format indicative of a delivery structure for the identified service, and the bitrate indicative of bandwidth occupied by the identified service;
   associating the service profile with each of the plurality of channels, the service profile indicative of subscriber requests assignable to each respective channel;
   locating a channel associated with a profile matching the media type of the subscriber request; and
   assigning the channel associated with the profile matching the media type to the subscriber request.

18. The method of claim 17 wherein the service profile associated with each channel specifies the service assignable to that channel and the media types of each associated profile indicate available formats assignable to the channel.

19. The method of claim 17 further comprising:
   computing, a loading for each channel, the loading indicative of assigned bandwidth currently unavailable for assignment to subscriber requests;
   assigning, if the service profile for the channel indicates multiple media types, matching subscriber requests to the most loaded channel for that media type; and
   assigning, if the service profile for the channel indicates a single media type, matching subscriber requests to an available block of bandwidth without crossing a block boundary into another block, the block size based on the bitrate.

20. The method of claim 17 further comprising:
   computing a blocking factor for each dedicated channel, the blocking factor indicating, based on the profile assigned to the channel, the media type having a highest bitrate; and
   assigning subscriber requests to the most loaded channel until a subsequent request would leave the channel with less than a full blocking factor.

* * * * *